(12) United States Patent
Hecht

(10) Patent No.: US 6,296,192 B1  
(45) Date of Patent: Oct. 2, 2001

(54) MACHINE-READABLE RECORD WITH A TWO-DIMENSIONAL LATTICE OF SYNCHRONIZATION CODE INTERLEAVED WITH DATA CODE

(75) Inventor: David L. Hecht, Palo Alto, CA (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/465,990

(22) Filed: Dec. 16, 1999

(51) Int. Cl.$^7$ ........................................... G06K 19/06
(52) U.S. Cl. ........................ 235/494; 235/487; 235/454; 235/456; 235/462.09
(58) Field of Search ..................... 235/494, 487, 235/454, 462.1, 456, 462.09; 382/181, 232

(56) References Cited

U.S. PATENT DOCUMENTS

| | | | | |
|---|---|---|---|---|
| 5,128,525 | | 7/1992 | Stearns et al. | |
| 5,221,833 | | 6/1993 | Hecht . | |
| 5,245,165 | | 9/1993 | Zhang . | |
| 5,449,895 | | 9/1995 | Hecht et al. . | |
| 5,449,896 | * | 9/1995 | Hecht et al. ........................ | 235/494 |
| 5,453,605 | | 9/1995 | Hecht et al. . | |
| 5,521,372 | | 5/1996 | Hecht et al. . | |
| 5,572,010 | * | 11/1996 | Petrie ................................. | 235/494 |
| 5,576,532 | * | 11/1996 | Hecht ................................. | 235/494 |
| 5,611,575 | * | 3/1997 | Petrie ................................. | 283/901 |
| 5,694,102 | | 12/1997 | Hecht . | |
| 5,717,197 | * | 2/1998 | Petrie ................................. | 235/494 |
| 5,825,933 | * | 10/1998 | Hecht ................................. | 382/181 |
| 5,862,271 | * | 1/1999 | Petrie ................................. | 382/232 |
| 5,870,510 | * | 2/1999 | Hecht ................................. | 382/309 |
| 5,929,429 | * | 7/1999 | Petrie ................................. | 235/494 |
| 5,937,110 | * | 8/1999 | Petrie et al. ........................ | 382/306 |
| 5,939,703 | * | 8/1999 | Hecht et al. ........................ | 235/494 |
| 6,000,621 | * | 12/1999 | Hecht et al. ........................ | 235/494 |
| 6,092,732 | * | 7/2000 | Curry ................................. | 235/494 |
| 6,182,901 | * | 2/2001 | Hecht et al. ........................ | 235/494 |
| 6,208,771 | * | 3/2001 | Jared et al. ......................... | 382/306 |

* cited by examiner

Primary Examiner—Karl D. Frech  
Assistant Examiner—Uyen-Chau Le  
(74) Attorney, Agent, or Firm—Finnegan, Henderson, Farabow, Garrett & Dunner LLP (57) ABSTRACT

A machine-readable record is provided for storing encoded information comprising a record medium, data glyphs written on the media in a two-dimensional array and a sync code interleaved with the data code with the sync code occupying every $M_A$th and $M_B$th glyph position in the X and Y directions, with $M_A$ and $M_B$ each being integers greater than 1, such that there is a multiple utility of glyphs of the sync code as common parts of first and second code sequences.

6 Claims, 8 Drawing Sheets

| 0 | 0 | 1 | 1 | 1 | 0 | 1 | 0 | 0 |
| 1 | 1 | 0 | 0 | 0 | 1 | 0 | 1 | 1 |
| 1 | 1 | 0 | 0 | 0 | 1 | 0 | 1 | 1 |
| 0 | 0 | 1 | 1 | 1 | 0 | 1 | 0 | 0 |
| 1 | 1 | 0 | 0 | 0 | 1 | 0 | 1 | 1 |
| 1 | 1 | 0 | 0 | 0 | 1 | 0 | 1 | 1 |
| 0 | 0 | 1 | 1 | 1 | 0 | 1 | 0 | 0 |
| 1 | 1 | 0 | 0 | 0 | 1 | 0 | 1 | 1 |
| 1 | 1 | 0 | 0 | 0 | 1 | 0 | 1 | 1 |

| | | | | | | | | | | | | | | | |
|---|---|---|---|---|---|---|---|---|---|---|---|---|---|---|---|
| d u00 | d u01 | d u02 | d u03 | d u04 | d u05 | d u06 | d u07 | d u08 | d u09 | d u10 | d u11 | d u12 | d u13 | d u14 | d u00 | y = 00 |
| d v00 | d v01 | d v02 | d v03 | d v04 | d v05 | d v06 | d v07 | d v08 | d v09 | d v10 | d v11 | d v12 | d v13 | d v14 | d v00 | y = 29 |
| d u14 | d u00 | d u01 | d u02 | d u03 | d u04 | d u05 | d u06 | d u07 | d u08 | d u09 | d u10 | d u11 | d u12 | d u13 | d u14 | y = 28 |
| d v14 | d v00 | d v01 | d v02 | d v03 | d v04 | d v05 | d v06 | d v07 | d v08 | d v09 | d v10 | d v11 | d v12 | d v13 | d v14 | y = 27 |
| d u13 | d u14 | d u00 | d u01 | d u02 | d u03 | d u04 | d u05 | d u06 | d u07 | d u08 | d u09 | d u10 | d u11 | d u12 | d u13 | y = 26 |
| d v13 | d v14 | d v00 | d v01 | d v02 | d v03 | d v04 | d v05 | d v06 | d v07 | d v08 | d v09 | d v10 | d v11 | d v12 | d v13 | y = 25 |
| d u12 | d u13 | d u14 | d u00 | d u01 | d u02 | d u03 | d u04 | d u05 | d u06 | d u07 | d u08 | d u09 | d u10 | d u11 | d u12 | y = 24 |
| d v12 | d v13 | d v14 | d v00 | d v01 | d v02 | d v03 | d v04 | d v05 | d v06 | d v07 | d v08 | d v09 | d v10 | d v11 | d v12 | y = 23 |
| d u11 | d u12 | d u13 | d u14 | d u00 | d u01 | d u02 | d u03 | d u04 | d u05 | d u06 | d u07 | d u08 | d u09 | d u10 | d u11 | y = 22 |
| d v11 | d v12 | d v13 | d v14 | d v00 | d v01 | d v02 | d v03 | d v04 | d v05 | d v06 | d v07 | d v08 | d v09 | d v10 | d v11 | y = 21 |
| d u10 | d u11 | d u12 | d u13 | d u14 | d u00 | d u01 | d u02 | d u03 | d u04 | d u05 | d u06 | d u07 | d u08 | d u09 | d u10 | y = 20 |
| d v10 | d v11 | d v12 | d v13 | d v14 | d v00 | d v01 | d v02 | d v03 | d v04 | d v05 | d v06 | d v07 | d v08 | d v09 | d v10 | y = 19 |
| d u09 | d u10 | d u11 | d u12 | d u13 | d u14 | d u00 | d u01 | d u02 | d u03 | d u04 | d u05 | d u06 | d u07 | d u08 | d u09 | y = 18 |
| d v09 | d v10 | d v11 | d v12 | d v13 | d v14 | d v00 | d v01 | d v02 | d v03 | d v04 | d v05 | d v06 | d v07 | d v08 | d v09 | y = 17 |
| d u08 | d u09 | d u10 | d u11 | d u12 | d u13 | d u14 | d u00 | d u01 | d u02 | d u03 | d u04 | d u05 | d u06 | d u07 | d u08 | y = 16 |
| d v08 | d v09 | d v10 | d v11 | d v12 | d v13 | d v14 | d v00 | d v01 | d v02 | d v03 | d v04 | d v05 | d v06 | d v07 | d v08 | y = 00 |
| d u07 | d u08 | d u09 | d u10 | d u11 | d u12 | d u13 | d u14 | d u00 | d u01 | d u02 | d u03 | d u04 | d u05 | d u06 | d u07 | y = 14 |
| d v07 | d v08 | d v09 | d v10 | d v11 | d v12 | d v13 | d v14 | d v00 | d v01 | d v02 | d v03 | d v04 | d v05 | d v06 | d v07 | y = 13 |
| d u06 | d u07 | d u08 | d u09 | d u10 | d u11 | d u12 | d u13 | d u14 | d u00 | d u01 | d u02 | d u03 | d u04 | d u05 | d u06 | y = 12 |
| d v06 | d v07 | d v08 | d v09 | d v10 | d v11 | d v12 | d v13 | d v14 | d v00 | d v01 | d v02 | d v03 | d v04 | d v05 | d v06 | y = 11 |
| d u05 | d u06 | d u07 | d u08 | d u09 | d u10 | d u11 | d u12 | d u13 | d u14 | d u00 | d u01 | d u02 | d u03 | d u04 | d u05 | y = 10 |
| d v05 | d v06 | d v07 | d v08 | d v09 | d v10 | d v11 | d v12 | d v13 | d v14 | d v00 | d v01 | d v02 | d v03 | d v04 | d v05 | y = 09 |
| d u04 | d u05 | d u06 | d u07 | d u08 | d u09 | d u10 | d u11 | d u12 | d u13 | d u14 | d u00 | d u01 | d u02 | d u03 | d u04 | y = 08 |

```
                                                                        FROM FIG. 9
. d v11  d v12  d v13  d v14  d v00  d v01  d v02  d v03  d v04  d v05  d v06  d v07  d v08  d v09  d v10  d v11   y = 07
. d u03  d u04  d u05  d u06  d u07  d u08  d u09  d u10  d u11  d u12  d u13  d u14  d u00  d u01  d u02  d u03   y = 06
. d v12  d v13  d v14  d v00  d v01  d v02  d v03  d v04  d v05  d v06  d v07  d v08  d v09  d v10  d v11  d v12   y = 05
. d u02  d u03  d u04  d u05  d u06  d u07  d u08  d u09  d u10  d u11  d u12  d u13  d u14  d u00  d u01  d u02   y = 04
. d v13  d v14  d v00  d v01  d v02  d v03  d v04  d v05  d v06  d v07  d v08  d v09  d v10  d v11  d v12  d v13   y = 03
. d u01  d u02  d u03  d u04  d u05  d u06  d u07  d u08  d u09  d u10  d u11  d u12  d u13  d u14  d u00  d u01   y = 02
. d v14  d v00  d v01  d v02  d v03  d v04  d v05  d v06  d v07  d v08  d v09  d v10  d v11  d v12  d v13  d v14   y = 01
. d u00  d u01  d u02  d u03  d u04  d u05  d u06  d u07  d u08  d u09  d u10  d u11  d u12  d u13  d u14  d u00   y = 00
. d v00  d v01  d v02  d v03  d v04  d v05  d v06  d v07  d v08  d v09  d v10  d v11  d v12  d v13  d v14  d v00   y = 29 d x=0  d x=1  d x=2  d x=3  d x=4  d x=5  d x=6  d x=7  d x=8  d x=9  d x=10 d x=11 d x=12 d x=13 d x=14 d x=0
FROM FIG. 9
```

*FIG. 9 (CONT.)*

MACHINE-READABLE RECORD WITH A TWO-DIMENSIONAL LATTICE OF SYNCHRONIZATION CODE INTERLEAVED WITH DATA CODE

CROSS REFERENCES

This application is related to a concurrently filed, commonly assigned U.S. patent application Ser. No. 09/464,934, entitled "Exclusive Or Cross-Coupled Framing Codes For Self-Clocking Glyphs," to David L. Hecht.

FIELD OF THE INVENTION

This invention relates to framing formats for self-clocking glyph codes and, more particularly, to framing formats that include a lattice infrastructure of reference glyphs for encoding overhead information combined with a matrix of data glyphs.

BACKGROUND OF THE INVENTION

As is known, self-clocking glyph codes are suitable for embedding machine readable data in images of various descriptions, but they are especially advantageous for applications that require or benefit from having the machine readable data embedded in the images in a visually nonobstructive or aesthetically pleasing way. Specifically, to provide a visually homogeneous glyph pattern (a glyph pattern in which the glyphs are substantially indistinguishable from each other when viewed by the naked eye under normal lighting conditions) all of the glyphs of the self-clocking glyph pattern typically are defined by symbols from the same symbol set, such as slash-like symbols that are tilted from vertical at approximately ±45° to encode binary "0s" and "1's," respectively. More generally, however, a "glyph" is any optical character that has at least two graphical states for encoding at least two logic states ("1" and "0") of a single bit.

A self-clocking glyph pattern comprises data glyphs that encode information of user interest and reference glyphs that encode overhead information, such as spatial synchronization, address information, labeling information and authentication. This overhead information facilitates the reading and/or interpretation of the data glyphs. Typically, data glyphs are arranged in a two-dimensional lattice. Reference glyphs may also take on a two-dimensional lattice configuration. For example, U.S. Pat. No. 5,449,895, entitled "Explicit Synchronization For Self-Clocking Glyph Codes," gives a number of examples of data glyphs, reference glyphs, and lattice structures.

In general, many of the applications for two-dimensional reference glyphs codes interleaved with data glyph codes involve synchronization of glyph codes. U.S. Pat. No. 5,449,895 for example, deals with facilitating robust synchronization of glyph codes This patent also cites useful background references on self-clocking glyph codes and related applications. The contents of U.S. Pat. No. 5,449,895 is hereby expressly incorporated herein by reference.

U.S. Pat. No. 5,576,532 entitled, "Interleaved and Interlaced Sync Codes and Address Codes for Self-clocking Glyph Codes," describes self-clocking reference glyphs interleaved or interlaced in two dimensions with data glyphs to facilitate the partitioning and correlation of data embedded in the data glyph codes. Specifically, with respect to FIG. 4 there is disclosed the mapping of interwoven two-dimensional interleaved reference glyph codes with data glyphs into a self-clocking glyph code pattern.

Thus, the '531 patent discloses interleaved self-clocking glyph codes to facilitate the partitioning and/or correlation of data subsets based on local spatial relations of reference glyphs in a data glyph code pattern. This approach can improve the interpretation of the logical relationship among data sets and the data in each data set. Both one-dimensional and two-dimensional linear subarray interleaving is described. The contents of U.S. Pat. No. 5,576,532 is hereby expressly incorporated herein by reference.

The present invention builds on and extends the techniques disclosed in U.S. Pat. Nos. 5,449,895 and 5,576,532.

SUMMARY OF THE INVENTION

Consistent with the principles of the present invention, machine-readable record for storing encoded information is provided that comprises a recording medium; a data code comprising data glyphs written on the recording medium in a two-dimensional spatial array, and a code for synchronization of the data code written on the recording medium interleaved with the data code, the synchronization code comprising a two-dimensional lattice with first code sequences extending in a first direction of the lattice and second code sequences extending in a second direction of the lattice, the framing code occupying every $M_a$th and $M_b$th of the data code in the first and second directions, with $M_a$ and $M_b$ each being integers greater than 1. As a consequence, there is a multiple utility of glyphs of the framing code at intersections of the first and second sequences. Preferably, the first and second directions are lines orthogonal to each other. It is possible, but not required, that the first and second sequences are identical.

BRIEF DESCRIPTION OF THE DRAWINGS

Still further features and advantages of this invention will become apparent when the following detailed description is read in conjunction with the attached drawings in which.

DETAILED DESCRIPTION OF THE ILLUSTRATED EMBODIMENTS

While the invention is disclosed in some detail below with specific reference to certain illustrated embodiments, it is to be understood that there is no intent to limit the invention to the disclosed embodiments. On the contrary, the goal is to cover all modifications, alternatives and equivalents that fall within the spirit and scope of the invention as defined in the appended claims.

Figure 1:
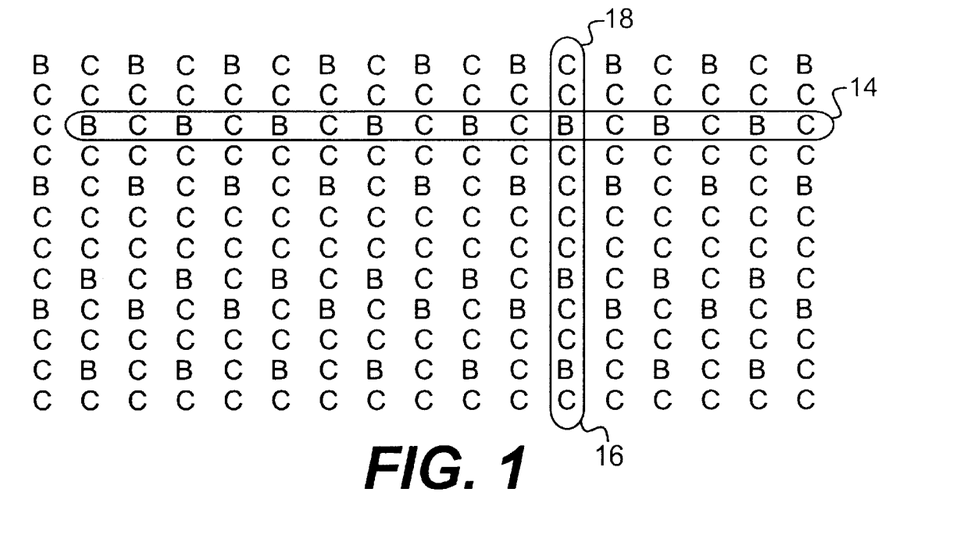
FIG. 1 illustrates a glyph pattern having a sync code interleaved with a data code consistent with the principles of the present invention.

As shown in FIG. 1, a data code comprising data glyphs C may be written on a recording medium in a two-dimensional spatial array. In one embodiment, the data glyphs C are written on the medium on centers spatially distributed in nominal accordance with a two-dimensional spatial formatting rule. As may be seen in FIG. 1, glyphs C are written in an orthogonal array comprising rows and columns at right angles to one another. The creation, encoding and printing of the data code of FIG. 1 is considered conventional and should be well-known to those skilled in the art.

In accordance with the teachings of the present invention, and as an illustration thereof, in FIG. 1 a framing code is represented as interleaved with glyphs C of the data code. Specifically, a periodic subarray of reference glyphs B is shown FIG. 1, with a reference glyph B occupying each $M_a$th data glyph position along the X direction and a reference glyph B occupying each $M_b$th data glyph position along the Y direction, where "$M_a$" and "$M_b$" are integers greater than 1. The lines of direction of the lattice comprising the sync code are preferably along the X and Y axes of the lattice comprising the data code. However, it should be understood that these lines of direction may be non-orthogonal, as in a hexagonal lattice, for example. Moreover, the sequences along a given direction may be identical.

In general, each glyph in the interleaved periodic framing lattice will be a member of two linear spatial sequences of glyphs, with neighbors at intervals $M_a$ and $M_b$. Specifically, as shown in FIG. 1, the interval for $M_a$ is 2 and the interval for $M_b$ is 4. Accordingly, the framing code lattice enables the multiple utility of glyphs B read as parts of difference sequences. For example, as shown in FIG. 1 the glyphs B contained in line 14 may comprise a first sequence, whereas the glyphs in line 16 may comprise a second sequence. In this case, there is a multiple utility of glyph 18 as part of both the sequence of line 14 and the sequence of line 16.

Furthermore, it should be understood that the designation C and the designation B in FIG. 1 may stand not just for individual glyphs, but also for glyph patterns or subarrays.

With the teachings of the present invention, a sequence of decoding each $M_a$ and/or $M_B$ glyphs in a particular direction will implicitly include either only members of the applicable periodic framing code subset or none. This is particularly important in establishing synchronization.

Figure 2:
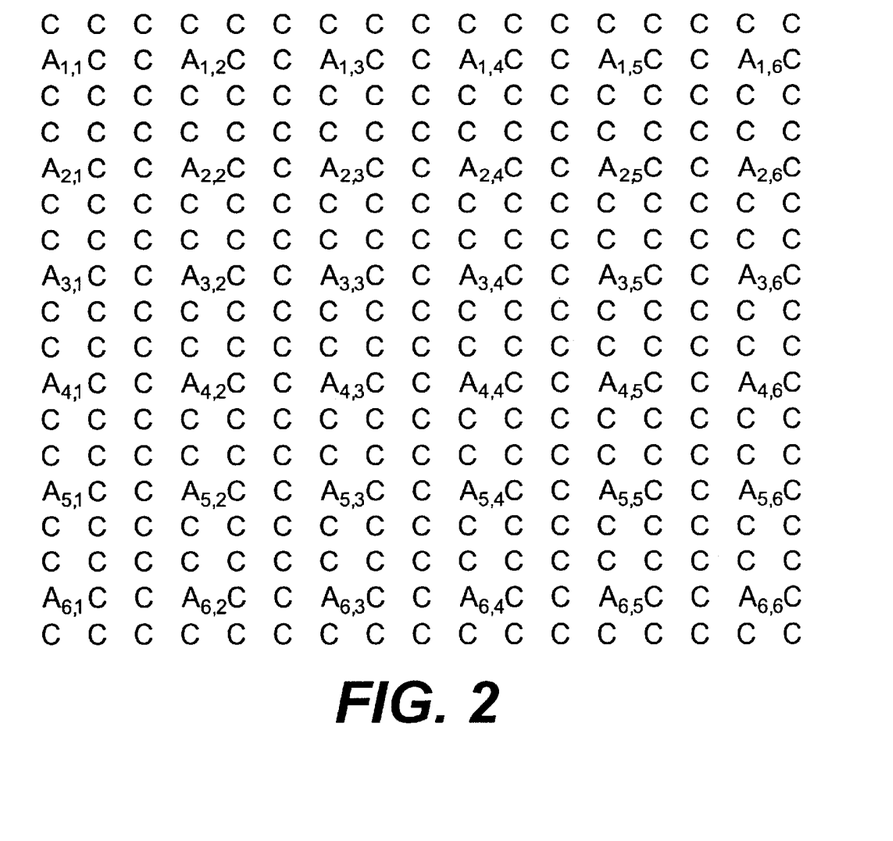
FIG. 2 illustrates an alternative embodiment of a sync code interleaved with a data code, consistent with the principles of the present invention.

FIG. 2 illustrates the interleaving of a two-dimensional lattice data code with a lattice reference code comprising reference glyphs $A_{n,m}$. Reference glyphs $A_{n,m}$ are located periodically with N and M both equal to 3, thereby resulting in equal spacing of glyphs $A_{n,m}$ along both horizontal and vertical directions. This facilitates a very homogeneous distribution of the elements of the lattice framing code among those of the lattice data code. For example, as shown in FIG. 2, eight data glyphs C surround each reference glyph $A_{n,m}$ and, thus, could represent a data byte. The shape of the subarray patterns for bytes (such as this square pattern), can be altered to correspondingly alter the bit error encoding characteristics of the result and pattern due to spatial effects.

There is no requirement that N equals M. Typically, reference lattice code glyphs $A_{n,m}$ could serve to form a two-dimensional sync code for data glyphs C.

Again, dual utility is expressed in the embodiment of FIG. 2 wherein, for example, glyph $A_{3,3}$ is available for use in encoding the reference lattice code for both column 3 and for row 3. This dual utilization of reference lattice element 3,3 can leverage both the two-dimensional spatial geometry of the resulting self-clocking glyph pattern and the two-dimensional mathematical properties of the reference lattice code. In particular, in reading glyphs, the expected location of an element in the reference lattice code can be estimated from the location of neighbors in the reference lattice code in at least four directions, that is along two lines in each of the vertical and horizontal directions.

Figure 3:
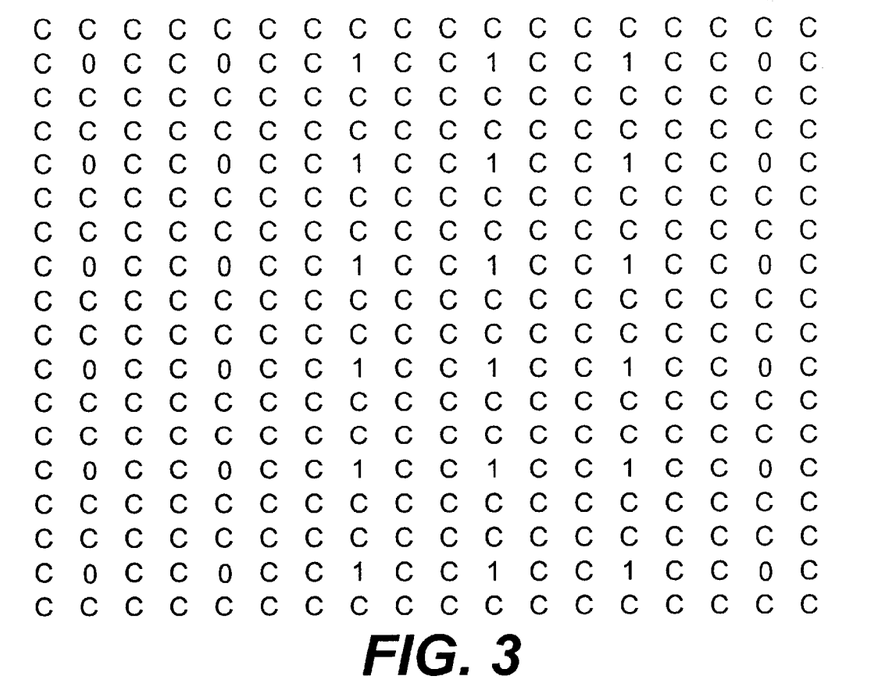
FIG. 3 illustrates a still further embodiment of a framing code interleaved with a data code, consistent with the principles of the present invention, wherein all of the values of the synchronization code are redundant with respect to each row of sync code.

FIG. 3 discloses an example of redundant row codes, where $A_{I,J}$ equals $a_J$, and $a_J$ defines a code that is the same for each row, such as a horizontal addressing code. Thus, each column subarray of $A_{I,J}$ has all the same glyph bit values and can serve as an effective synchronization code.

Figure 4:
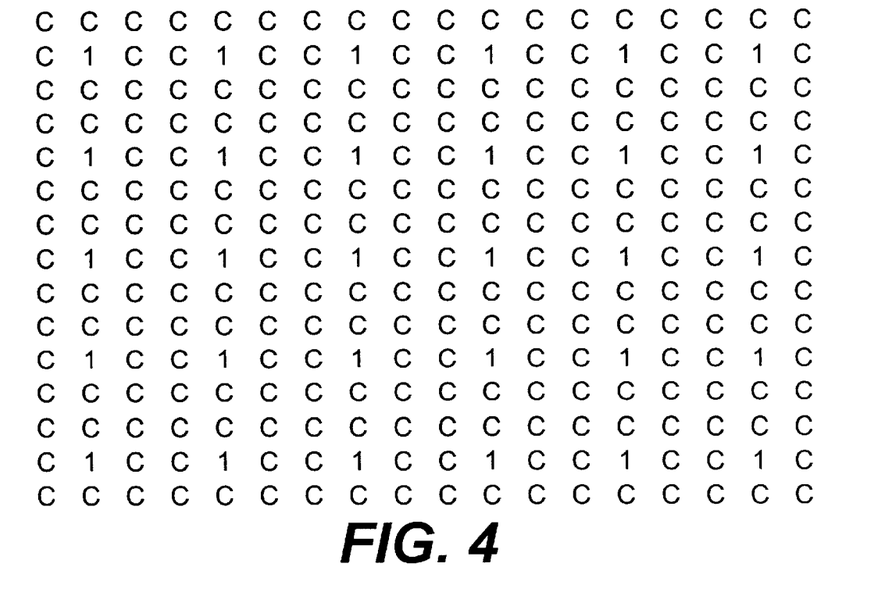
FIG. 4 illustrates the interleaving of a sync code with a data code, consistent with the principles of the present invention, wherein all of the glyphs comprising the framing code are made up of the data value 1.

FIG. 4 illustrates the use of two-dimensional constant synchronization codes wherein each element $A_{I,J}$ equals "1." This case forms a very efficient code for local synchronization since it has maximum distinguishability from random data bits. In addition, the dispersion of the constant glyph representing "1" tends to suppress its visual distinction from surrounding glyph patterns, especially compared to a linear pattern of the same glyph. In FIG. 4, if absolute addressing is required a separate code may be used.

Figure 5:
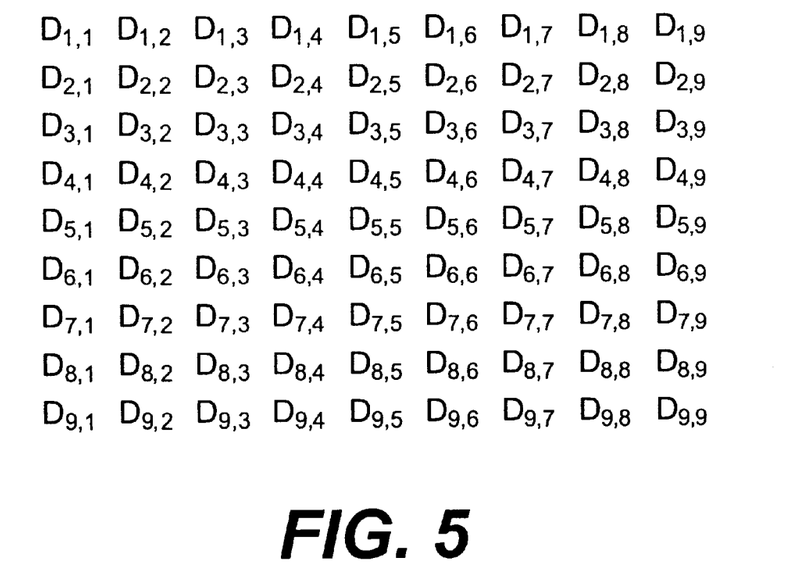
FIG. 5 illustrates the positions of an EXCLUSIVE OR logic value matrix.
Figure 6:
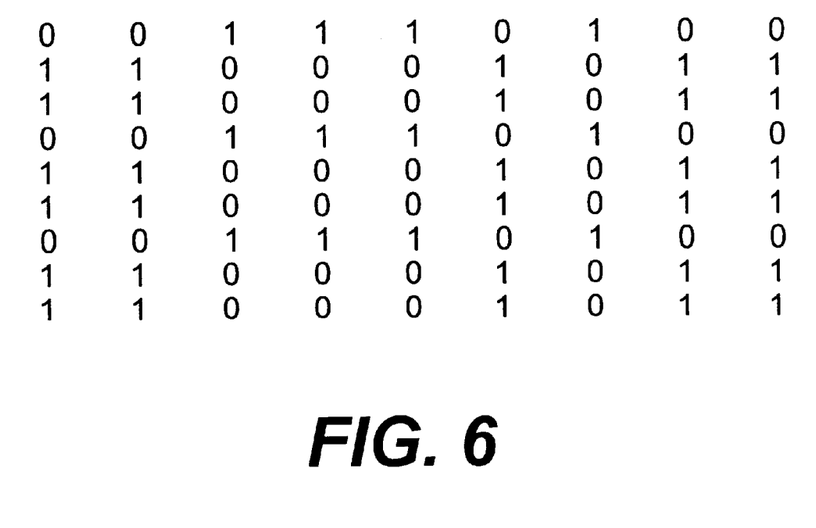
FIG. 6 illustrates the content of a matrix of EXCLUSIVE OR logic values.
Figure 7:
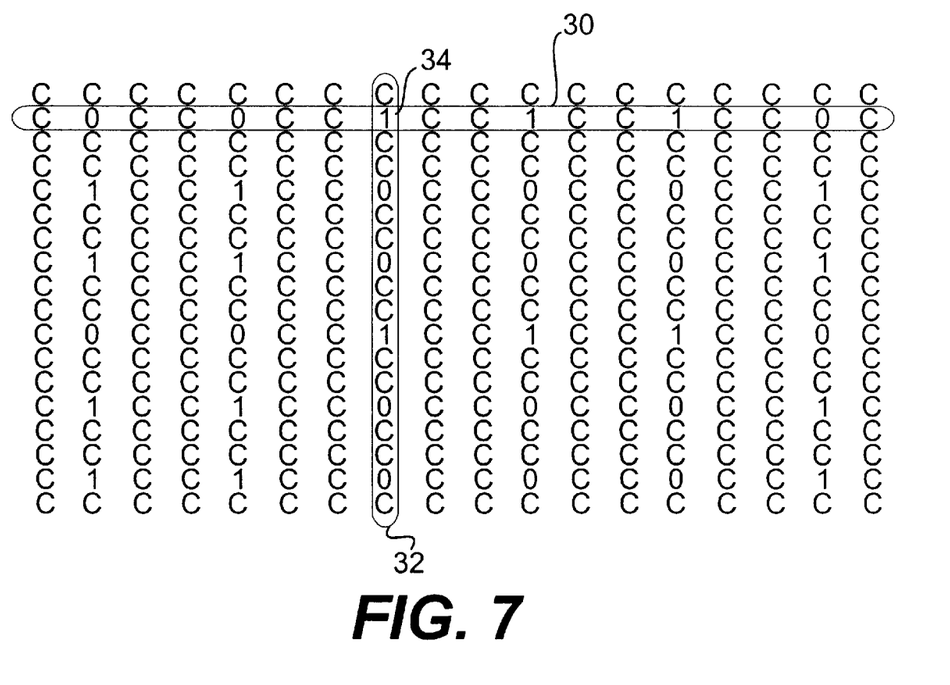
FIG. 7 illustrates an interleaved mapping of a sync code developed utilizing EXCLUSIVE OR logic values with a data code, consistent with the principles of the present invention.

FIGS. 5, 6, and 7 demonstrate an EXCLUSIVE OR methodology for developing cross-coupled codes. In accordance with the teaching of this aspect of the invention, two-dimensional framing codes are interleaved for self-clocking glyph codes which permit intersecting framing lines to be encoded with independent synchronization and addressing code information, while intrinsically managing conflicts of the bit values for glyphs at intersections. This technique thus permits the utilization of framing code subarrays of any size, independent of the frame code. This method encodes all glyphs with the value determined by a logic EXCLUSIVE OR ("XOR") of two code lines. Thus, an entire code line of glyphs is inverted with respect to an input code when the corresponding code for that line in the other input code has a value of "1." Using this technique, parallel sync lines should have the same code with equivalent logical positions (code phase) at every intersection.

As one illustrative example, a first code line bit sequence A may comprise values 011011011 . . . and be used for a vertical direction code line bit sequence. A second code line bit sequence B may have the values 0011101001 . . . and be used for a horizontal code line bit sequence. When first bit line sequence A is EXCLUSIVE OR'd with the second bit line sequence B, a matrix $D_{I,J}$ (i,j) is formed, whereby $D_{I,J}$ (i,j) equals $A_{j(j)} \oplus B_{i(i)}$. Thus, the first step in implementing this aspect of the subject invention involves the establishment of first and second code line bit sequences such as, by way of example, code line bit sequences A and B. The second step is to determine the EXCLUSIVE OR (XOR) logic value of the first and second code lines to obtain a two-dimensional matrix of XOR logic values. One such two-dimensional matrix is illustrated in FIG. 5 as showing at the various vertical and horizontal locations a logic value $D_{I,J}$ calculated as indicated above. In FIG. 6, the specific value for each location $D_{I,J}$ is given for the A and B code line bit sequences identified above, namely where A equals 011011011 . . . and B equals 0011101001 . . . Those skilled in the art should understand that, given the above example, the intersection of a row and column code for a given parallel line the resultant logic value is inverted if the corresponding code for that line in the second code bit line sequence has a value of "1." The inherent result of the EXCLUSIVE OR operation thus intrinsically manages conflicts for glyphs at the intersections of the resultant matrix of XOR logic values.

For decoding, all that is necessary is to detect the bits that have been subject to inversion. For synchronization codes, this is typically readily accomplished by comparing a specific $D_{I,J}$ value with the corresponding first and second code line bit sequence values. A typical method for decoding synchronization codes is to correlate the read bit pattern against the predefined sync pattern to find a sharp maximum. If all the read bits are flipped, the correlation will be a sharp negative maximum. Then a code A can be read from any of the columns from the reference lattice and the code B can be read from any of the rows of the reference lattice. Reading a row and a column can provide the XY address of the intersection glyph.

This XOR encoding can be applied to any rectangular or any parallelogram lattice structure, independent of interlace of another glyph pattern array.

To create EXCLUSIVE OR sync code, in accordance with the teachings of the present invention, attention is directed toward FIG. 7, wherein an interleave methodology is disclosed such that the sync codes of FIG. 6 are now interleaved with data glyphs C, as has previously been described. In the embodiment of FIG. 7, $M_a$ equals 3 and $M_b$ equals 3. As a general rule, $M_a$ and $M_b$ must each be integers greater than 1, but they need not equal each other. Thus, there is provided a sync code comprising a two-dimensional lattice in that the frame code extends in both the horizontal and vertical directions. A first code sequence, for example 001110, extends horizontally in a first, horizontal line direction 30 while, for example, a second code sequence 100100 extends in a second, vertical line direction of the lattice. As a consequence of the present technique, there is multiple utility of glyphs, such as glyph 34 of the framing code, as a common part of both the first sequence in row 30 and the second sequence in row 32.

One utility of the XOR method of the present invention is that the framing code sequences A and B to be XOR'd need not have a predefined length to avoid intrinsic conflicts in the resultant framing code matrix. For decoding, all that is necessary is the identification of the inverted bits. Once those bits have been reverted to their original condition, the A code can be read from any of the columns of the framing code lattice and the B code can be read from any of the rows of the framing code lattice.

With respect to the present invention, it is advantageous to enable the resultant interleaved glyph lattice to appear visually homogeneous under ordinary viewing conditions. For this purpose, glyphs and different interlaced subpatterns are preferably members of the same glyph set, and the glyph cell center spacings between neighboring glyphs are preferably consistent across the interleaved subpatterns. It is possible to have the same glyphs represent different data values and different subpatterns, or even represent different numbers of bits, for example, where some subpatterns incorporate more distinct glyphs, such as a slash with four possible rotation positions versus the more typical two rotational positions.

On the other hand, distinct patterns may be purposefully obtained by interleaving subpatterns with distinct glyph orientations, glyph shapes, glyph sizes, glyph color, or glyph tiling patterns. Incorporating these distinct features naturally facilitates distinguishing interleaved lattice glyphs during a read and decoding process.

Figure 8:
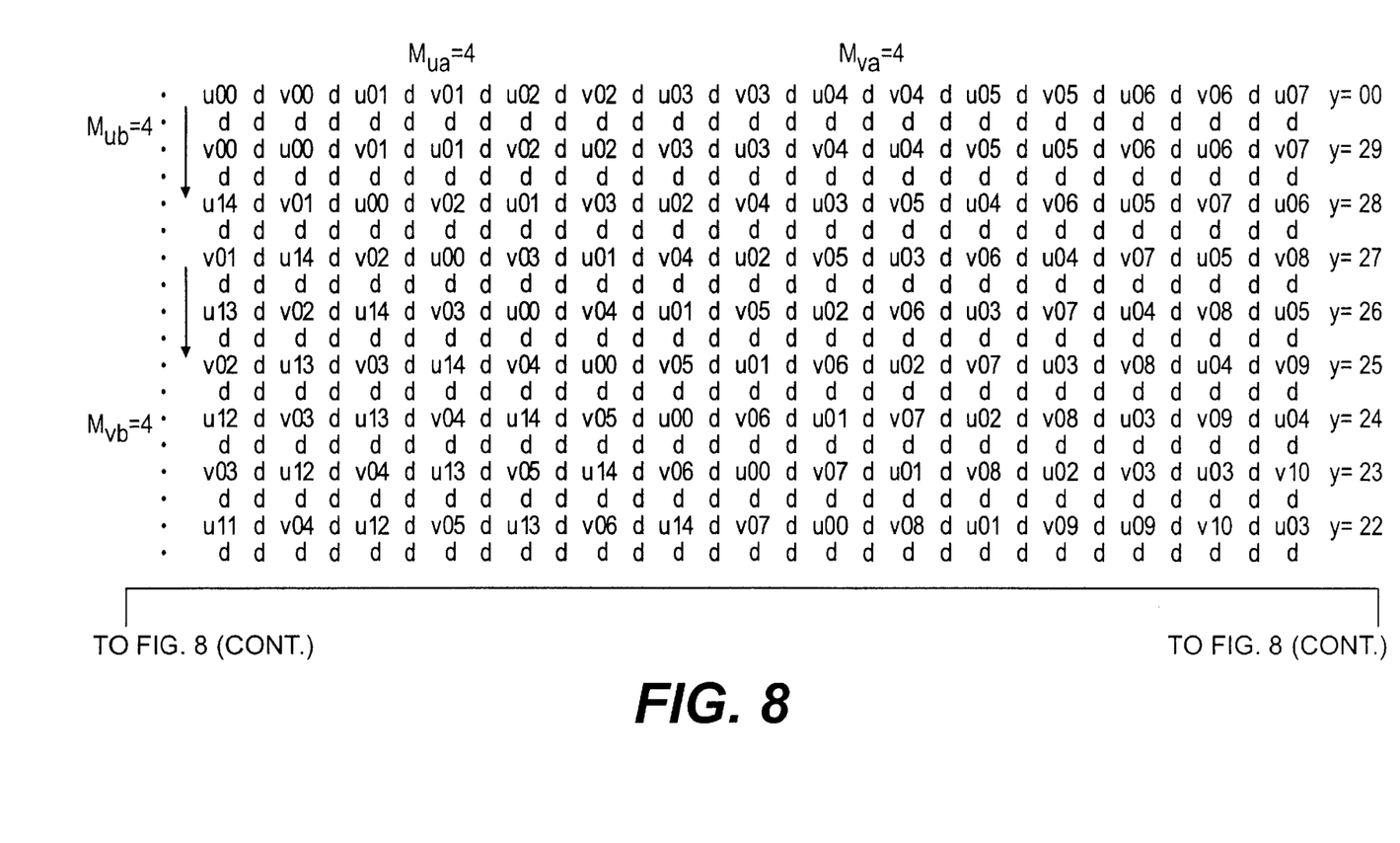
FIG. 8 illustrates an embodiment of a lattice layout in which the code sequence in each row is shifted one position relative to the code sequence in adjacent rows.

FIG. 8 illustrates an embodiment of a lattice layout in which the code sequence in each row is shifted one position relative to the code sequence in adjacent rows. The same code sequence can be read off either a horizontal line or column of lattice glyphs. This embodiment includes two lattice codes, u and v, which have shifts in opposite directions. The lattice has integer position intervals $M_{ua}=4$, $M_{va}=4$, $M_{ub}=4$, and $M_{vb}=4$. In the particular case where u and v are address codes, this enables reading a local address from either a row or column of lattice glyphs, either of which contains both sequences of the u and v codes. In one embodiment, the d codes may be absent, leaving only the address code comprised of lattice codes.

Figure 9:
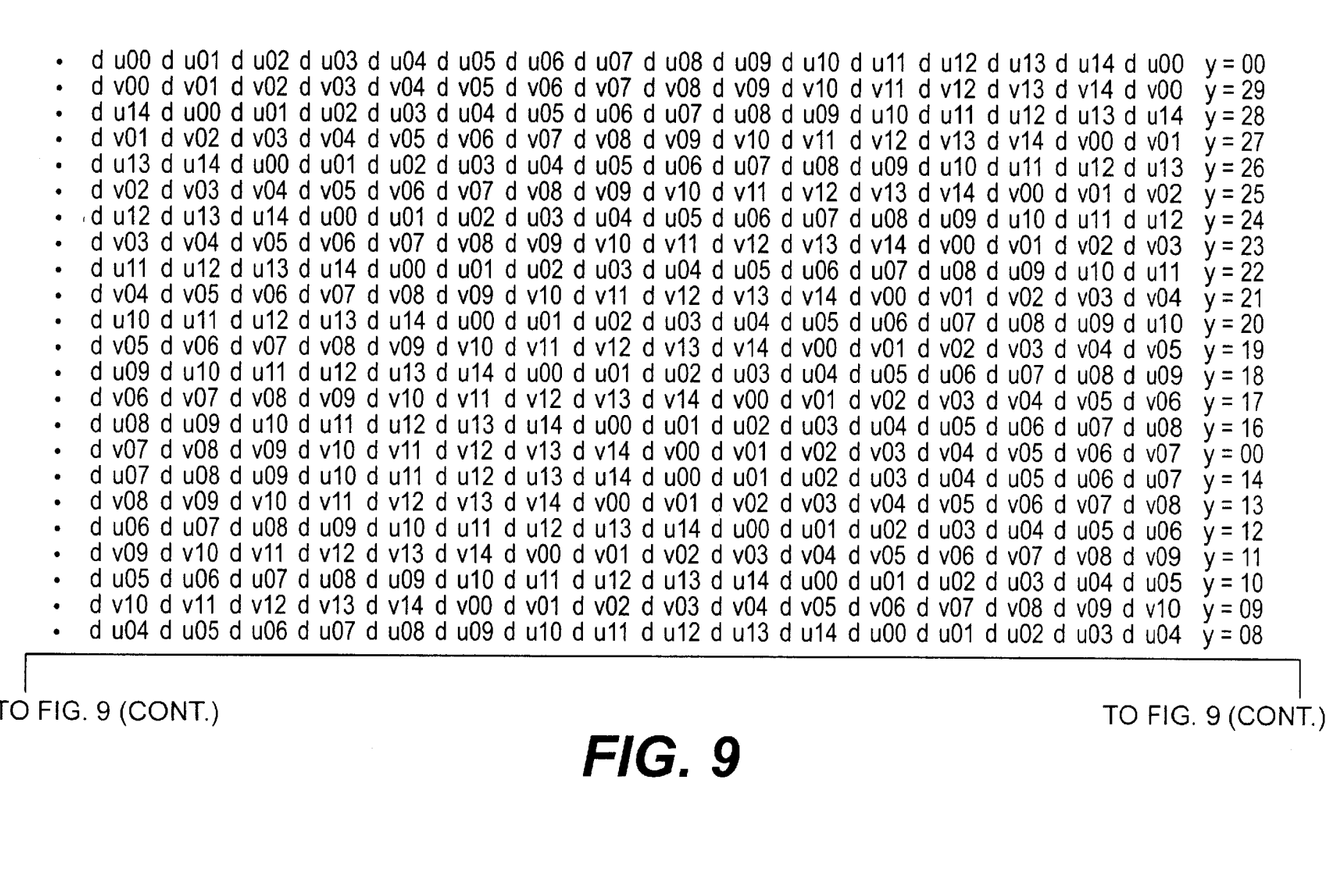
FIG. 9 illustrates another example where shifting two codes enables them to be read off either horizontal rows or vertical columns.

FIG. 9 illustrates another example where shifting two codes enables them to be read off either horizontal rows or vertical columns. In this case, since the u and v are not interleaved horizontally, two rows must be captured to read both u and v codes. This configuration of codes may also be used as an address carpet where u and v are address codes.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention.

What is claimed is:

1. A machine-readable record for storing encoded information, said record comprising:
   a record medium;
   a data code comprising data glyphs written on said recording medium in a two-dimensional spatial array; and
   a synchronizing code for synchronization of said data code written on said medium interlaced with said data code, said synchronizing code comprising:
   a two-dimensional lattice with first code sequences in a first direction of said lattice and second code sequences in a second direction of said lattice, said synchronizing code occupying every $M_a$th and $M_b$th glyph position in said first and second directions, with $M_a$ and $M_b$ each being integers greater than 1, and wherein there is a multiple utility of glyphs of said synchronizing code as common parts of said first and second sequences.

2. The record of claim 1 wherein said first and second directions are lines orthogonal to each other.

3. The record of claim 1 wherein said first and second sequences are identical.

4. The record of claim 1, wherein said synchronizing code comprises glyphs having characteristics distinct from said data glyphs.

5. The record of claim 1, wherein said data code is the same sequence in each row shifted one position per row.

6. The record of claim 1, wherein said data code comprises first and second data codes shifted oppositely by one lattice interval per row.

* * * * *